3,450,725
6,17,19-SUBSTITUTED 3α,5α-CYCLOANDROSTANES
John Soloman Tadanier, Chicago, Ill., assignor to Abbott Laboratories, North Chicago, Ill., a corporation of Illinois
No Drawing. Filed Oct. 24, 1966, Ser. No. 588,733
Int. Cl. C07c *169/20, 169/24, 167/00*
U.S. Cl. 260—397.4         11 Claims

ABSTRACT OF THE DISCLOSURE

6 - (substituted)amino - 19 - hydroxy - 3α,5α - cycloandrostan-3-ones and closely related derivatives thereof are made from 6β,19-oxido-3α,5α-cycloandrostan-17-one through a new 3β-alkyl-(or aryl or arylalkyl)-3-sulfonoxy-19-hydroxyandrost-5-en-17-one or its analogs. The new 6-aminosteroids are endocrine agents which cause a favorable anabolic/androgenic balance.

DISCLOSURE

The present invention is directed to new steroid derivatives and a process for their manufacture; more particularly the invention is directed to compounds of the formula

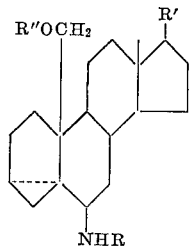

wherein R is hydrogen or R'''CO, R' is oxygen or R''O, each R'' is hydrogen or R°CO, and R° and R''' represent a loweralkyl group of from 1 to 4 carbon atoms. The invention is also directed to intermediates of the formula

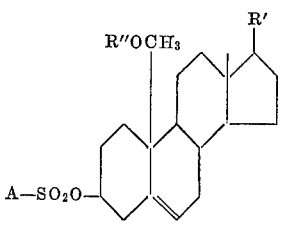

wherein A is lower alkyl, phenyl or toluyl and wherein R' and R'' have the above meaning, which are the precursors for the above-identified end products. These precursors are prepared by treating 6β,19-oxido-3α,5α-cycloandrostan-17-one (described by Tanabe et al. in Chem. Pharm. Bull. (Japan), volume 10, page 1126 of 1962) with sodium borohydride in methanol and reacting the formed 17β - hydroxy - 6β,19 - oxido - 3α,5α - cycloandrostane with the appropriate sulfonic acid of formula A—SO₂OH or by direct treatment of the above named 17-ketone with the appropriate acid under anhydrous conditions and in the presence of an inert, organic solvent.

The new amines are prepared by treating the above precursors carrying a hydroxy group at 19 and a hydroxy or keto group at 17 for a period of at least 4 hours with ammonia at a temperature of at least 80° C. to produce 6β-amino-17β,19-hydroxy-3α,5α-cycloandrostane or the corresponding 17-ketone. All of the above compounds can be treated with acylating agents to produce the corresponding 6-acylamino compounds with esterified hydroxy groups at 19 and/or 17, and, if desired, the acyl esters may be hydrolyzed by known methods to produce the corresponding 6β-acylamino compounds with a free hydroxy group at 19 or at 17 and 19 without the loss of the acyl group on the nitrogen atom in the 6-position. The free hydroxy group may then be re-esterified with a different fatty acid to form the compounds wherein R and R'' are different from one another.

The new compounds are pharmaceutically useful as endocrine agents, causing a favorable anabolic/androgenic response in warm-blooded animals as measured by the ratio of levator ani growth to prostate growth. To attain this new balance, the animals are treated subcutaneously at a dose of 1–10 mg./kg./day.

To better understand the processes leading to the new compound and intermediates of the present invention, reference is made to the following examples which are meant to be illustrations only and are not intended to limit the invention in any respect.

Example 1.—17β-hydroxy-6β,19-oxido-3α,5α-cycloandrostane

A solution of 1.0 g. of 6β,19-oxido-3α,5α-cyclo-androstan-17-one and 70 ml. of methanol is stirred in an ice-bath, and a freshly prepared solution of 1.82 g. of sodium borohydride in 20 ml. of water is added. Stirring is continued under ice-cooling for 40 minutes and the resulting solution is then poured into 700 ml. of water to give a white suspension which is extracted with three 400-ml. portions of ether. The ether extracts are washed in series with three 300-ml. portions of water, combined, and dried over anhydrous magnesium sulfate. Evaporation of the other leaves 1.09 g. of 17β-hydroxy-6β,19-oxido-3α,5α-cycloandrostane as a white solid melting at 182–183° C.; $[\alpha]_D^{24}=+68°$ as a 1% solution in chloroform.

Example 2.—3β-p-toluenesulfonoxy-17β,19-dihydroxy-androst-5-ene

A solution prepared from 4.0 g. of p-toluenesulfonic acid monohydrate and 200 ml. of benzene is heated under reflux for one hour using a water separator. After cooling to room temperature, a solution of 2.01 g. of 6β,19-oxido-17β-hydroxy-3α,5α-cycloandrostane in 200 ml. of benzene is added with stirring over a period of 10 minutes. Stirring is continued for 15 minutes and the resulting solution is diluted to 500 ml. with benzene and shaken with 600 ml. of water. The aqueous phase is separated and extracted with 500 ml. of benzene. The benzene solutions are washed, in series, with 500 ml. of water, 500 ml. of 5% aqueous sodium bicarbonate and three 500-ml. portions of water. The benzene extracts are then combined, dried over anhydrous magnesium sulfate and evaporated to leave 3.16 g. of 3β-p-toluenesulfonoxy-17β-19-dihydroxyandrost-5-ene, which is crystallized by trituration with 20 ml. of petroleum ether. The pure compound melts at 125–126° C. with decomposition. The analytical values are in good agreement with the values calculated from empirical formula $C_{26}H_{36}O_5S$.

When the above p-toluenesulfonic acid is replaced by the equivalent amount of methansulfonic acid, 3β-methansulfonoxy-17β,19-dihydroxyandrost-5-ene is obtained. Similarly, the 3β-benzenesulfonoxy compound is obtained by using benzenesulfonic acid as the co-reactant in the above process.

Example 3.—6β-amino-17β,19-dihydroxy-3α,5α-cycloandrostane

A mixture of 3.2 g. of 3β-p-toluenesulfonoxy-17β-19-dihydroxyandrost-5-ene and 70 ml. of liquid ammonia is heated for 16 hours in an autoclave at 100°. The ammonia is then evaporated and the residue is shaken with a mixture of 800 ml. of ether and 300 ml. of 2.5% aqueous sodium hydroxide. The aqueous phase is separated and extracted with two 400-ml. portions of ether. The ether solutions are washed, in series, with three 250-ml. portions of water, combined, and concentrated to a volume of about 200 ml. The resulting solution is extracted with 100 ml. of 0.16 N hydrochloric acid. The aqueous phase containing the amine hydrochlorine is separated and extracted with 300 ml. of ether. The ether solutions are extracted, in series, with two 100-ml. portions of 0.16 N hydrochloric acid, and these aqueous solutions are added to the original aqueous extract containing amine hydrochloride.

The ether solutions are washed, in series, with two 200-ml. portions of water, 250 ml. of 5% aqueous sodium bicarbonate and three 200-ml. portions of water, combined, and dried over anhydrous magnesium sulfate. Evaporation of the ether leaves 165 mg. of a neutral, orange oil.

The aqueous solution containing the amine hydrochloride is briefly warmed with charcoal on a steam bath and then filtered with the help of diatomaceous earth. The filter is washed with four 50-ml. portions of hot 0.16 N hydrochloric acid and the washings are added to the original filtrate. The resulting aqueous solution is cooled to room temperature and treated with 500 ml. of 2.5% aqueous sodium hydroxide. The resulting mixture is extracted with three 800-ml. portions of ether and the ether solutions are washed, in series, with three 400-ml. portions of water, combined, and dried over anhydrous magnesium sulfate. Evaporation of the ether leaves 1.07 g. of a white, crystalline solid. Recrystallization of this material from aqueous methanol gives 802 mg. of 6β-amino-17β,19-dihydroxy-3α,5α-cycloandrostane melting at 190–192° C. An analytical sample shows a melting point of 192–193° C.; $[\alpha]_D^{24} = +52°$ as a 1% solution in chloroform, and its analytical values are in good agreement with the values calculated from empirical formula $C_{19}H_{31}O_2N$.

When the above used starting material is replaced by 3β-methanesulfonoxy-17β,19-dihydroxyandrost-5-ene, the identical procedure results in obtaining the 6β-amino compound described which shows no depressed melting point when mixed with the above compound melting at 190–192°.

Example 4.—6α-acetamido-17β,19-diacetoxy-3α,5α-cycloandrostane

A mixture of 2.8 g. of 3β-p-toluenesulfonoxy-17β,19-dihydroxyandrost-5-ene and 80 ml. of liquid ammonia is heated for 16 hours at 100° C. in an autoclave. The ammonia is evaporated and the residue is shaken with a mixture of 300 ml. of ether and 200 ml. of 5% aqueous sodium hydroxide. The aqueous phase is separated and extracted with 300 ml. of ether. The ether solutions are washed, in series, with four 300-ml. portions of water, combined, and dried over anhydrous magnesium sulfate. Evaporation of the solution leaves 1.16 g. of the crude amine of which 926 mg. is dissolved in 42 ml. of pyridine and 15 ml. of acetic anhydride is added. The solution is allowed to stand over night at room temperature and is then shaken with a mixture of 300 ml. of water and 400 ml. of ether. The aqueous phase is separated and extracted with 400 ml. of ether. The ether solutions are washed, in series, with 300 ml. of water, 400 ml. of 5% aqueous sodium bicarbonate and three 300-ml. portions of water, combined and dried over anhydrous magnesium sulfate. Evaporation of the solvent leaves 1.23 g. of an oil which crystallizes upon trituration with pentane to yield 1.07 g. of crude 6β-acetamido-17β,19-diacetoxy-3α,5α-cycloandrostane, melting at 154–167° C. This material is recrystallized three times from acetone/petroleum ether to yield 652 mg. of the pure product melting at 170–171° C., $[\alpha]_D^{24} = +35°$ as a 1% solution in chloroform. The analytical values are in good agreement with the values calculated from empirical formula $C_{25}H_{37}O_5N$.

Where the above used 3β-p-toluenesulfonoxy-17β,19-dihydroxyandrost-5-ene is replaced by the corresponding 3β-benzenesulfonoxy compound, the same compound as just described is obtained.

By replacing the above used acetic anhydride with an equivalent amount of butyric anhydride, 6β-butyramido-17β,19-dibutyroxy-3α,5α-cycloandrostane of empirical formula $C_{31}H_{49}O_5N$ is obtained.

Example 5.—6β-acetamido-17β,19-dihydroxy-3α,5α-cycloandrostane

A solution of 306 mg. of 6β-acetamido-17β,19-diacetoxy-3α,5α-cycloandrostane in 15 ml. of 5% of methanolic potassium hydroxide is heated under reflux for one hour. The resulting solution is shaken with a mixture of 200 ml. of ether and 250 ml. of water. The aqueous phase is separated and extracted with 200 ml. of ether and the ether solutions are washed, in series, with three 100-ml. portions of water, combined, and dried over anhydrous magnesium sulfate. Evaporation of the ether leaves 201 mg. of 6β-acetamido-17β,19-dihydroxy-3α,5α-cycloandrostane, of which an analytical sample, recrystallized from ethanol/water, melts at 263–264° C.; $[\alpha]_D^{24} = +1.6$ as a 1% solution in pyridine. Its analysis matches the values calculated from empirical formula $C_{21}H_{33}O_3N$.

By allowing a solution of 6β-acetamido-17β,19-dihydroxy-3α,5α-cycloandrostane in pyridine with at least two molar equivalents of propionic anhydride to stand at room temperature over night, 6β-acetamido-17β,19-dipropionoxy-3α,5α-cycloandrostane is obtained in almost quantitative yield. By replacing the above propionic anhydride with butyryl chloride, 6β-acetamido-17β,19-dibutyroxy-3α,5α-cycloandrostane is obtained.

Example 6.—3β-p-toluenesulfonoxy-19-hydroxyandrost-5-en-17-one

A solution of 2 g. of p-toluenesulfonic acid monohydrate in 100 ml. of benzene is refluxed for 45 minutes using a water separator. The resulting solution is cooled to room temperature and a solution of 1.02 g. of 6β,19-oxido-3α,5α-cycloandrostan-17-one in 100 ml. of benzene is added drop-wire under stirring over a period of 15 minutes. The formed product is isolated as described in Example 2 to yield 1.55 g. of 3β-p-toluenesulfonoxy-19-hydroxyandrost-5-en-17-one which, without purification, melts at 155–158° C. with decomposition. Its analysis is in good agreement with the values calculated from empirical formula $C_{26}H_{34}O_5S$.

Replacing the above p-toluenesulfonic acid with an equimolar amount of ethanesulfonic acid, the described procedure yields 3β-ethanesulfonoxy-19-hydroxyandrost-5-en-17-one which may be substituted as the starting material in the following example without producing a different result.

Example 7.—6β-amino-19-hydroxy-3α,5α-cycloandrostan-17-one

By repeating the process of Example 3 but using as the starting material 3.2 g. of 3β-p-toluenesulfonoxy-19-hydroxyandrost-5-ene-17-one, and heating the crude product with 250 ml. of 5% methanolic potassium hydroxide for 1 hour under reflux, 6β-amino-19-hydroxy-3α,5α-cycloandrostan-17-one is obtained in a yield comparable to that shown in Example 3. Chemical analysis shows good agreement with the values calculated for the compound of empirical formula $C_{19}H_{29}O_2N$.

Example 8.—6β-acetamido-19-acetoxy-3α,5α-cycloandrostan-17-one

A solution is prepared from 300 mg. of 6β-amino-19-hydroxy-3α,5α-cycloandrostan-17-one in 24 ml. of acetic anhydride/pyridine 1:3. The solution is allowed to stand over night at room temperature. The acetylated product is extracted from this solution with ether in the usual manner and after the customary work-up, 6β-acetamido-19-acetoxy-3α,5α-cycloandrostan - 17 - one is obtained in good yield showing analytical values in good agreement with the compound of empirical formula $C_{23}H_{33}O_4N$.

Example 9.—6β-acetamido-19-hydroxy-3α,5α-cyclo-androstan-17-one

By following the procedure of Example 4 but using the compound of Example 8 as the starting material, 6β-acetamido-19-hydroxy-3α,5α-cycloandrostan - 17 - one is obtained showing analytical values in good agreement with those calculated for compound $C_{21}H_{31}O_3N$.

The key step in the preparation of the new intermediates and new compounds of the present invention consists essentially in reacting 17β-hydroxy-6β,19-oxido-3α,5α-cycloandrostane or the corresponding 17-ketone with sulfonic acid of the formula A—SO₂OH wherein A has the above meaning, e.g. any of the toluene-sulfonic acids, benzenesulfonic acid or a loweralkanesulfonic acid. For highest efficiency of this reaction, the sulfonic acid is used in excess over the molar equivalent required; an excess of 5–50% is adequate. The reaction between these two materials is performed under anhydrous conditions and in the presence of an inert, organic, solvent such as benzene, toluene, xylene, ether, tetrahydrofuran, chloroform, carbon tetrachloride, dioxane, acetone, chlorobenzene, and the like. The reaction takes place within a short time at room temperature so that it is sufficient to allow these co-reactants to be exposed to one another for a period of about 15 minutes at room temperature. Working up the reaction mixture is done in routine fashion: water is added and the formed 3-alkyl- or (aryl) sulfonoxy steroid is recovered by extraction with an inert, organic water-immiscible solvent.

I claim:

1. The process of preparing a compound of the formula

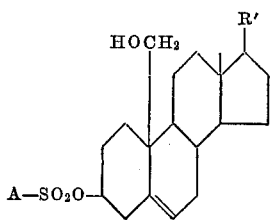

wherein A is loweralkyl, phenyl or toluyl, R' is oxygen or R"O, and R" is hydrogen or R°CO with R° being an alkyl group of from 1 to 4 carbon atoms, comprising reacting 6β,19-oxido-3α,5α-cycloandrostan-17-one or the corresponding 17-hydroxy compound with a sulfonic acid of the formula A—SO₂OH under anhydrous conditions in an inert, organic solvent and isolating the formed 3-substituted androstane derivative from said inert solvent.

2. The process of claim 1 wherein said inert solvent is benzene and said reaction is carried out at room temperature.

3. A steroid of the formula

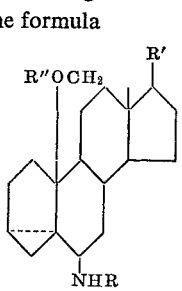

wherein R is hydrogen or R'''CO, R' is oxygen or R"O, each R" is hydrogen or R°CO, and R° and R''' represent a loweralkyl group of from 1 to 4 carbon atoms.

4. The steroid of claim 3 wherein R and R" both are hydrogen and R' is hydroxy.

5. The steroid of claim 3 wherein R and R" both are acetyl and R' is the acetoxy group.

6. The steroid of claim 3 wherein R is acetyl, R' is hydroxy and R" is hydrogen.

7. The steroid of claim 3 wherein R and R" both are hydrogen and R' is oxygen.

8. The steroid of claim 3 wherein R' is oxygen and R and R" both are acetyl.

9. A steroid intermediate of the formula

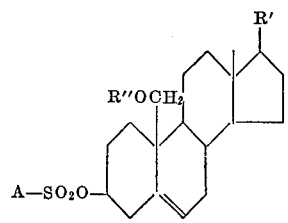

wherein A is phenyl, loweralkyl or toluyl, R' is oxygen or R"O, and R" is hydrogen or R°CO with R° being an alkyl group of from 1 to 4 carbon atoms.

10. The steroid intermediate of claim 9 wherein A is a p-toluyl group, R' is oxygen and R" is hydrogen.

11. The steroid intermediate of claim 9 wherein R' is hydroxy, R" is hydrogen and A is p-toluyl.

References Cited

UNITED STATES PATENTS 3,065,228   11/1962   Bowers _____ 260—239.55

FOREIGN PATENTS 732,173   4/1966   Canada.

OTHER REFERENCES

Tadanier, J.: Journ. Org. Chem., vol. 28, July 1963, pp. 1744–1751.

Moriarty et al.: Journ. Org. Chem., vol. 28, September 1963, pp. 2445–2446.

Tanabe et al.: Chem. Pharm. Bull'n, vol. 10, 1962, pp. 1126–1127.

LEWIS GOTTS, *Primary Examiner.*

ETHEL G. LOVE, *Assistant Examiner.*

U.S. Cl. X.R.

260—239.55, 397.5, 999

UNITED STATES PATENT OFFICE
CERTIFICATE OF CORRECTION

Patent No. 3,450,725

June 17, 1969

John Soloman Tadanier

It is certified that error appears in the above identified patent and that said Letters Patent are hereby corrected as shown below:

Column 1, lines 43 to 51, that portion of the formula reading "R"OCH3" should read -- R"OCH$_2$ --. Column 2, line 34, "other" should read -- ether --; line 38, "toluenesulfonoxy" should read -- Toluenesulfonoxy --. Column 3, line 47, "6α" should read -- 6β --. Column 4, line 43, "drop-wire" should read -- drop-wise --.

Signed and sealed this 24th day of March 1970.

(SEAL)
Attest:

Edward M. Fletcher, Jr.
Attesting Officer

WILLIAM E. SCHUYLER, JR.
Commissioner of Patents